United States Patent
Ray et al.

(10) Patent No.: US 6,613,710 B2
(45) Date of Patent: Sep. 2, 2003

(54) PROCESS FOR PREPARATION OF BI-FUNCTIONAL FLUID CATALYTIC CRACKING CATALYST COMPOSITION

(75) Inventors: Sanjay Kumar Ray, Haryana (IN); Mohan Prabhu Kuvettu, Haryana (IN); Venkatchalam Krishnan, Haryana (IN); Gopal Ravichandran, Haryana (IN); Kamlesh Gupta, Haryana (IN); Sukumar Mandal, Haryana (IN); Satish Makhija, New Delhi (IN); Sobhan Ghosh, Haryana (IN); Arumugam Velayutham Karthikeyani, Haryana (IN); Mitra Bhanu Patel, Haryana (IN)

(73) Assignee: Indian Oil Corporation Limited, Mumbai (IN)

( * ) Notice: Subject to any disclaimer, the term of this patent is extended or adjusted under 35 U.S.C. 154(b) by 107 days.

(21) Appl. No.: 09/961,384

(22) Filed: Sep. 25, 2001

(65) Prior Publication Data

US 2003/0069126 A1 Apr. 10, 2003

(51) Int. Cl.$^7$ .............................. B01J 21/16; B01J 29/06
(52) U.S. Cl. .............................. 502/68; 502/60; 502/64; 502/77; 502/78; 502/81
(58) Field of Search .............................. 502/60, 64, 68, 502/77, 78, 81, 84

(56) References Cited

U.S. PATENT DOCUMENTS

| | | | |
|---|---|---|---|
| 3,354,096 A | 11/1967 | Young et al. | |
| 3,911,041 A | 10/1975 | Kaeding et al. | |
| 3,972,832 A | 8/1976 | Butter et al. | |
| 4,044,065 A | 8/1977 | Butter et al. | |
| 4,239,654 A * | 12/1980 | Gladrow et al. | 502/67 |
| 4,313,923 A * | 2/1982 | Block et al. | 423/628 |
| 4,356,338 A | 10/1982 | Young | |
| 4,423,266 A | 12/1983 | Young | |
| 4,454,241 A | 6/1984 | Pine et al. | |
| 4,465,780 A | 8/1984 | Pine | |
| 4,498,975 A | 2/1985 | Pine et al. | |
| 4,504,382 A | 3/1985 | Pine | |
| 4,569,152 A | 2/1986 | Gracen et al. | |
| 4,578,371 A | 3/1986 | Rieck et al. | |
| 4,584,091 A | 4/1986 | Pine | |
| 4,605,637 A | 8/1986 | Chang et al. | |
| 4,629,717 A | 12/1986 | Chao | |
| 4,692,236 A | 9/1987 | Sato et al. | |
| 4,724,066 A | 2/1988 | Kirker et al. | |
| 4,765,884 A | 8/1988 | Walker et al. | |
| 4,839,319 A | 6/1989 | Schuette et al. | |
| 4,855,036 A * | 8/1989 | Chiang et al. | 208/120.15 |
| 4,873,211 A | 10/1989 | Walker et al. | |
| 5,173,463 A * | 12/1992 | Macedo | 502/68 |
| 5,190,902 A | 3/1993 | Demmel | |
| 5,194,412 A | 3/1993 | Roberie et al. | |
| 5,231,064 A | 7/1993 | Absil et al. | |
| 5,348,643 A | 9/1994 | Absil et al. | |
| 5,521,133 A | 5/1996 | Koermer et al. | |
| 5,925,586 A | 7/1999 | Sun | |
| 5,997,729 A * | 12/1999 | Itoh | 208/120.01 |
| 6,214,211 B1 * | 4/2001 | Itoh | 208/118 |
| 6,225,255 B1 | 5/2001 | Shibasaki et al. | |

* cited by examiner

*Primary Examiner*—M. Alexandra Elve
*Assistant Examiner*—Christina Ildebrando
(74) *Attorney, Agent, or Firm*—Lowe Hauptman Gilman & Berner, LLP

(57) ABSTRACT

A process for preparing bi-functional catalyst for Fluid Catalytic Cracking (FCC), that comprises molecular sieves, modified clay and semi-basic alumina and the catalyst for highly effective cracking of high boiling petroleum feedstock to provide simultaneously, enhanced yields of Liquefied Petroleum Gas (LPG) and reduction of undesirable bottoms.

21 Claims, No Drawings

PROCESS FOR PREPARATION OF BI-FUNCTIONAL FLUID CATALYTIC CRACKING CATALYST COMPOSITION

FIELD OF INVENTION

A process for the preparation of bi-functional catalyst for Fluid Catalytic Cracking (FCC) process that comprises molecular sieves, modified clay and semi-basic alumina. The catalyst is highly effective in the cracking of high boiling petroleum feedstock to provide simultaneously, enhanced yields of Liquefied Petroleum Gas (LPG) and reduction of undesirable bottoms.

BACKGROUND AND PRIOR ART REFERENCES

FCC catalyst additives are commonly used since late eighties to improve the profitability of refiners. They are, additive for improving LPG and octane number, $SO_x$ additive for reduction of sulphur emission, CO-Promoter additive for containment of CO emission and Bottom cracking additives for reducing bottoms.

LPG enhancing additive plays an important role in boosting LPG and/or to improve the octane number of gasoline. It has been used commercially for almost a decade, and is now a well accepted way to increase $C_3$ and $C_4$ olefin yields and gasoline octane.

ZSM-5 zeolite forms the most active component of these additives. Quite a lot of work has been done on making zeolites, such as ZSM-5, with different materials, ranging from all silica to materials containing silica and some other tetravalent metal such as boron, iron, gallium, etc. In lieu of, or in addition to, being incorporated into the zeolite framework, these and other catalytically active elements can also be deposited upon the zeolite by any suitable procedure, e.g., impregnation.

In spite of the tremendous benefits arising out of using ZSM-5 based compositions for enhancing LPG certain gap areas still remain un-addressed. The main drawbacks of these compositions are that, higher LPG yield is attained at a cost. ZSM-5 additives generally dilute the host catalyst inventory and there by catalyst activity decreases necessitating higher catalyst charge. The bottom yield either remains same or increases. Presently there is no catalyst in the market, which at one go satisfies the two needs of refiners, i.e. enhancement of LPG and reduction of bottoms.

In order to formulate ZSM-5 based additives the catalyst researchers confront the task of making aqueous slurries using hydrophobic zeolite and other ingredients. The issue of producing attrition resistant low cost additives is bothering manufacturers worldwide. The other issue is the production of cost effective additives. ZSM-5 zeolite is an expensive chemical; its manufacturing process is very time consuming, capital intensive and complex. Hence there is always a demand to formulate ZSM-5 based additives using lower quantities of zeolite without compromising on LPG yield. The other additive which off late has been widely used by the refiners is bottom cracking additive. This additive is used to reduce the yield of undesirable bottom products of FCC cracker.

Number of refiners today face the challenge to produce more LPG and reduced bottom. Hence it is a long imperative to develop such a product, which will meet both these requirements without affecting the general yield pattern.

There is thus an urgent requirement of an catalyst formulation which when used as FCC additive will be bi-functional, i.e. besides meeting the first requirement of LPG enhancement it must reduce the undesirable CLO or slurry oil.

Considerable work has been done on formulating and optimizing catalyst compositions containing ZSM-5 zeolite as the main and active ingredient. It will be briefly reviewed.

U.S. Pat. No. 4,826,793, incorporated by reference, teaches ZSM-5 additives for FCC use with 20, 40 or 60 wt % ZSM-5 in an attrition resistant matrix. ZSM-5 may be stabilized with phosphorous or be in a phosphorous containing matrix. The technique employed was to prepare at lower pH, clay phosphate slurry, raise its pH by adding phosphorus-containing salts before addition of zeolites. This invention raised an issue that remains un-addressed in the patent domain, i.e. addition of zeolite to a low pH matrix without destruction of zeolite. On the other hand increasing pH by addition of phosphorus containing salts has some negative effects on binding strength of the final composite due to dilution effect. A gap in our understanding thus remains which the present invention is trying to bridge.

Phosphorous stabilization is well known in the art, and more details of the technique are given in the following patents. U.S. Pat. No. 3,911,041, which is incorporated by reference, teaches conversion of methanol and ethers over phosphorous stabilized zeolites. U.S. Pat. No. 3,972,832, which is incorporated by reference, teaches and claims a composition of matter of a phosphorus containing, shape selective zeolite having at least 0.78 wt % phosphorus incorporated with the crystal structure. U.S. Pat. No. 4,044,065, claims conversion of aliphatics over phosphorus containing shape selective zeolites. U.S. Pat. Nos. 4,356,338 and 4,423,266 teach decreasing catalyst coking, and extending catalyst life, by pretreatment of the catalyst with steam and/or a phosphorus-containing compound. P-ZSM-5/$Al_2O_3$ has a much-reduced coking rate, as compared to H-ZSM-5/$Al_2O_3$. U.S. Pat. No. 4,590,321, which is incorporated by reference, claims conversion of feeds comprising $C_2$ to $C_{12}$ alkanes or alkenes at 200 to 700° C. over a phosphorus stabilized zeolite made by impregnating with phosphate ions, then calcining to convert phosphate ions to an oxide of phosphorus. U.S. Pat. No. 5,194,412 provides improved catalytic compositions that include a zeolite and aluminum phosphate. U.S. Pat. No. 3,354,096 describes zeolite containing adsorbent and catalyst compositions that contain a phosphate-binding agent to improve physical strength. U.S. Pat. No. 3,649,523 describes hydrocracking catalysts which comprise a zeolite and an aluminum phosphate gel matrix. U.S. Pat. Nos. 4,454,241, 4,465,780, 4,498,975 and 4,504,382 describe zeolite catalysts that are prepared from clay which are further modified by the addition of a phosphate compound to enhance catalytic activity. U.S. Pat. Nos. 4,567,152, 4,584,091, 4,629,717 and 4,692,236 describe zeolite containing catalytic cracking catalysts that include phosphorus-containing alumina. U.S. Pat. Nos. 4,605,637, 4,578,371, 4,724,066 and 4,839,319 describe phosphorus and aluminum phosphate modified zeolites such as ZSM-5, Beta and ultrastable Y that are used in the preparation of catalytic compositions, including catalytic cracking catalysts. U.S. Pat. No. 4,765,884 and U.S. Pat. No. 4,873,211 describe the preparation of cracking catalysts which consist of a zeolite and a precipitated aluminum phosphate gel matrix. U.S. Pat. No. 5,521,133 relates to microspheres produced by spray drying clay slurries and calcining the product to form attrition-resistant microspheres. More particularly, this invention relates to the addition of phosphoric acid to clay in a novel manner, i.e., injecting the acid into dispersed kaolin slurry immediately before spray drying to improve properties of the microspheres. U.S. Pat. No. 5,190,902 utilizes the addition of phosphoric acid (or other phosphate compounds) with kaolin clay in a spray drying process to produce spray-dried microspheres, which are then calcined. In some formulation zeolite particles are present in the spray dryer feed. The process is carried out in one of two basic ways. In one, the slurry of clay particles is brought to a low pH, e.g., 1.0 to 3.0 before being mixed with a source of phosphorus, followed by spray drying. In the other, the clay slurry is brought to a high pH level (e.g., 10 to 14) before mixing with phosphate-containing compound. According to the teachings of this patent, use of these pH ranges is necessary for the production of particles with superior attrition resistance. Similarly, U.S. Pat. No. 5,231,064, and U.S. Pat. No. 5,348,643, both describe formation of a cracking catalyst by spray drying a slurry of zeolite with a slurry of clay treated with a phosphorus source at a pH less than 3. Sufficient water is added to bring the combined slurries to a low solids content of 25%. The use of aluminum phosphates as a binder and hardening agent is well known in the ceramics industry (F. J. Gonzalez and J. W. Halloran Ceran. Bull 59(7), 727 (1980)). This usually involves addition of alumina to the ceramic mix, followed by treatment with phosphoric acid, curing and firing. Similarly, the hardening of aluminous masses such as those composed of bauxite or kaolin clay by incorporation of phosphoric acid followed by heat treatment also is known. The product of this treatment is apparently an aluminum phosphate that can act as a binder. An aluminum phosphate formed by interaction of phosphoric acid solution with an aluminum salt solution has been used to bind zeolite and clay in a cracking catalyst composition (U.S. Pat. No. 5,194,412).

U.S. Pat. No. 5,925,586 relates to a process for the modification of a small pore molecular sieve catalyst to increase its selectivity in producing ethylene and propylene, particularly ethylene, in the production of light olefins from oxygenates, particularly methanol. The present invention, besides providing an improved process for enhancing LPG yield, addresses the issues of loss of gasoline yield, either static or increase of bottom yield, which are typically observed when LPG enhancing additives are used. Another problem that is also associated with use of the latter is loss in activity. The process of preparation of dual function catalyst as described in the present invention addresses all these issues. The presence of modified clay with specifically skewed pore size distribution provides access to bulk sized hydrocarbon molecules which constitutes major portions of the bottom of the barrel. Specially prepared alumina by virtue of its semi-basic nature creates an environment in the precursor slurry that does not affect adversely the crystallinity of ZSM-5 zeolite. Presence of alumina of the present invention creates a synergy with the modified clay wherein LPG yield is increased at the cost of bottom without compromising in gasoline yield or coke make.

U.S. Pat. No. 6,225,255 by Shibasaki, et al. relates to an additive catalyst for use with a cracking catalyst, in the cracking of heavy oils, especially with fluidized catalytic cracking (FCC) catalysts. This catalyst comprises two metal oxides acidic basic, clay and silica. In this invention, there is no process for modification of clay. Above all, this catalyst performs only one function of cracking of heavy oils.

The distinguishing features between the U.S. Pat. No. 6,225,255 and the present invention are provided in the following table:

Distinguishing features between the present patent application and U.S. Pat. No. 6,225,255.

| patent application. No. | Present application. | U.S. Pat. No. 6,225,255 |
| --- | --- | --- |
| Intended application of catalyst | FCC additive for enhancing LPG and reducing bottom yields | Additive for the cracking of heavy oil. |
| Main ingredients of the catalyst | Phosphate reacted clay Alumina ZSM-5 zeolite Normal kaolinite | The additive catalyst comprises (i) an acidic metal oxide other than silica, or an acidic mixed metal oxide, (ii) clay, (iii) silica, and (iv) a basic metal oxide. |
| Composition | Uniform throughout the catalyst | Core comprises acidic metal oxide on top there is basic metal oxide. 5 to 50 wt % basic metal oxide, while 5 to 70 wt % of total weight of additive catalyst acidic oxide. |

OBJECTS OF THE PRESENT INVENTION

The main object of the present invention is to provide an improved process of preparation of bi-functional catalyst compositions suitable for FCC process.

Another object of the present invention is to develop a process for preparing FCC catalyst additive compositions suitable for enhancing LPG.

Yet another object of the present invention is to provide for reduction in undesirable bottoms.

Still, another object of the present invention is to develop a process for preparing dual function FCC catalyst additive compositions suitable for reducing undesirable bottoms.

Yet another object of the present invention is to develop a process for preparing dual function FCC catalyst compositions suitable for simultaneously enhancing LPG and reducing undesirable bottoms.

It is another object of the present invention is to develop a process for preparing modified clay suitable for use as FCC catalyst compositions.

Yet another object of the present invention is to develop a process in which zeolite destruction will not take place during the preparation of precursor slurry.

An another object of the present invention is to develop a process for preparing semi-basic alumina suitable for use as FCC catalyst compositions.

Yet another object of the present invention is to provide improved catalyst compositions containing very small quantity of ZSM-5 zeolite Still, another object of the present invention is to provide improved catalyst compositions containing crystalline molecular sieves, finely dispersed semi-basic alumina and modified clay.

Yet another object of the present invention is to develop a process for preparing FCC catalyst compositions suitable for enhancing LPG without reducing gasoline yield Still, another object is to provide a method for preparing FCC catalyst, which is resistant to attrition.

It is still a further object to provide a FCC catalyst, which has improved density.

SUMMARY OF THE PRESENT INVENTION

The present invention provides for an improved process, for the preparation of FCC catalyst wherein modified clay slurry is added to finely dispersed semi-basic alumina; the resulting mixture is combined with a solution of zeolite powder under high shear mixing conditions to obtain a spray drier feed slurry; catalyst slurry is held in a spray dryer feed storage tank, under mixing conditions until spray dried, at high temperatures and calcined to obtain FCC catalyst.

DETAILED DESCRIPTION OF THE PRESENT INVENTION

Accordingly, the present invention provides for a process for the preparation of bi-functional catalyst for Fluid Catalytic Cracking (FCC), to obtain enhanced yields of LPG and reduced slurry oil, said process comprising;

(i) preparing a modified kaolin clay slurry by mixing finely milled natural clay powder with phosphoric acid, and aging the clay slurry for 1 to 16 hours at a temperature ranging between 15 and 40° C.;

(ii) preparing a semi-basic alumina by mixing a solution of sodium aluminate and aluminum sulphate at elevated temperatures, mixing under aging conditions for about 1 to 3 hours and removing alumina crystals by filtration and washing the semi-alumina cake with water at about 75–85° C.;

(iii) mixing 40–80 wt % of the modified clay slurry (of step i) with 1–20 wt % of the finely dispersed semi-basic alumina (of step ii) and homogenizing the mixture with crystalline molecular sieve zeolite, which is present in the range of 0.5 to 5wt %;

(iv) spray drying the final slurry; and (v) calcining the spray dried product to obtain said bi-functional catalyst.

In an embodiment of the present invention, said crystalline molecular sieve zeolite is selected from a group comprising mordenite, ZSM-5 and Beta.

In yet another embodiment of the present invention, said modified clay precursor slurry is having pH in the range of 0.1 to 2.

Further, in yet another embodiment of the present invention, the modified clay precursor slurry has solid concentration in the range of 20–80-wt %.

Still, in yet another embodiment of the present invention, the clay modification is done at a temperature from 15 to 40° C.

Yet another embodiment of the present invention, wherein the clay modification is done for a period from 1 to 16 hours.

Yet another embodiment of the present invention, wherein the modified clay when dried at 110° C. for 16 hours and subsequent calcinations at 500° C. for 1 hour shows surface area of about 20 to 40 $m^2/g$.

In yet another embodiment of the present invention, the modified clay when dried at 110° C. for 16 hours and subsequent calcinations at 500° C. for 1 hour exhibits an average pore diameter of 90–120° A.

In yet another embodiment of the present invention, the presence of modified clay with specifically skewed pore size distribution provides access to bulk sized hydrocarbon molecules that constitute major portion of the bottom of the barrel.

Still, in yet another embodiment of the present invention, the semi-basic alumina is prepared by mixing aluminum salts with sodium aluminate at a temperature of 50–100° C.

In yet another embodiment of the present invention, the semi-basic alumina is prepared by mixing aluminum salts with sodium aluminate for duration from 30 minutes to 3 hours.

In yet another embodiment of the present invention, the crystallized semi-basic alumina product is having solid content of 10–20-wt %.

In yet another embodiment of the present invention, the crystallized semi-basic alumina product is having pH in the range of 7.5–9.

An another embodiment of the present invention, wherein the crystallized semi-basic alumina product has particle size between 4000–5000 nm.

Yet another embodiment of the present invention, wherein the crystalline semi-basic alumina has surface area in the range of 140 to 160 $m^2/g$.

Further another embodiment of the present invention, wherein the crystalline semi-basic alumina product has average pore diameter in the range of from 80–100 angstrom.

Still, another embodiment of the present invention, wherein the presence of semi-basic alumina creates an environment in the precursor slurry that does not affect adversely the crystallinity of ZSM-5 zeolite.

Yet another embodiment of the present invention, wherein the presence of semi-basic alumina creates a synergy with modified clay resulting in increased LPG yield at the cost of bottom without compromising with gasoline yield or coke make.

In yet another embodiment of the present invention, the crystallized semi-basic alumina product has crystallinity between 65 to 90%.

In yet another embodiment of the present invention, fluid catalytic cracking reactions conducted under conditions at a reaction temperature of about 400° C. to 700° C. and regeneration temperature of 500 to 850° C.

Further another embodiment of the present invention, wherein said hydrocarbon is selected from the group consisting of gas-oil, residual oil and mixtures thereof.

Yet another embodiment of the present invention, wherein the said catalyst is taken in the range of 1 to 10 wt % and mixed with FCC catalyst for catalytic cracking of high boiling feedstock.

Still another embodiment of the present invention, wherein said catalyst is resistant to attrition having an attrition index in the range from 3 to 15%.

The present invention is further explained in the form of the following preferred embodiments.

Modified Clay

In a preferred method, the process for preparing Modified clay of the present invention comprises in the steps of mixing finely ground natural clay powder under stirring with diluted phosphoric acid at temperature from 15–40° C. and subjecting the mixture to a step of aging from 1 to 16 hours to obtain the final slurry having a pH from 0.1 to 2 preferably from 0.1 to 1, solid concentration in the range of 20–80 wt % preferably from 30 to 60 wt %.

The modified clay slurry when evaluated by subjecting to steps of drying at 110° C. for 16 hours and subsequent calcinations at 500° C. for 1 hour will have surface area typically in the range from 15–50 $m^2/g$, preferably about 20–40 $m^2/g$ and average pore diameter in the range of 90–120° A.

Semi-basic Alumina

In a preferred method, the process for preparing semi-basic alumina of the present invention comprises in the steps making solution of sodium aluminate and of aluminum sulfate $(Al_2(SO_4)_3)$ at 90–95° C., mixing both the solutions under vigorous stirring and heating the final slurry at 90–100° C., preferably at 90–95° C., for a period of 1 to 5 hours, preferably, for a period of 1 to 3 hours, filtering and washing with hot water at 60–90° C., preferably, at 75–85° C. The washed semi-basic alumina cake when made into slurry has a pH in the range of 7.5 to 9.

The washed semi-basic alumina cake when evaluated by subjecting to steps of drying at 110° C. for 16 hours and subsequent calcinations at 500° C. for 1 hour will have surface area typically in the range from 120–180 m²/g, preferably about 140–160 m²/g, X-ray crystallinity in the range from 65 to 90%, average particle size typically in the range from 1000 nm to 4000 nm preferably about 1000–2000 nm, residual soda typically in the range from 0.1–0.7 wt %, preferably about 0.1–0.2 wt %.

FCC Catalyst

In a preferred method, for preparing the FCC catalyst of the present invention, (a) modified clay slurry prepared by the process of present invention is added to (b) finely dispersed semi-basic alumina, prepared by the process of present invention, and (c) the resulting mixture is combined with a solution of zeolite powder (d) under high shear mixing conditions to obtain a spray drier feed slurry that contains 20 to 45 wt % solids which preferably comprises (dry basis) 1 to 10 wt % alumina, 4–8 wt % phosphate, 0.3–10 wt % zeolite and 70 to 90 wt % kaolin. The catalyst slurry is held in a spray dryer feed storage tank, (e) under mixing conditions until spray dried, (f) at a temperature of 200° C. to 400° C., (g) and calcined for 1 hour at a temperature of 450–600° C.

In the present invention, part of the clay can be substituted with other finely divided inorganic components such as other types of clays, silica, alumina, silica-alumina gels and sols may be included.

The particulate spray dried FCC catalyst has a particle size range of 20 to 150 microns, preferably 20–120 microns and is held in FCC catalyst storage container prior to use. The catalyst may be used as an additive in a conventional FCC unit wherein the FCC catalyst is reacted with a hydrocarbon feedstock at 400 to 700° C., preferably at 400–600° C. and regenerated at 500 to 850° C., preferably at 500–750° C., to remove coke.

Typically the catalyst possess an attrition index of 3–15, and preferably 5–10, as determined by the IOC Attrition Index Test described as follows. The catalyst samples were calcined at 538° C. for 3 hours prior to measurement for attrition resistance (index). In the method catalyst attrition at high, constant air jet velocity was measured. The fines were removed continuously from the attrition zone by elutriation into a flask-thimble assembly, and weighed at periodic intervals. It is assumed that the test conditions are similar to those encountered in hydrocarbon conversion operations. The attrited or overhead catalyst so measured is expressed as the weight percent overhead. Percent attrition is calculated as follows:

Percent Attrition =

$$\frac{\text{Grams overhead in 5-20 hours period} * 100}{50 \text{ gms (initial) charge} - \text{gms overhead in 0-5 hrs. period}}$$

Percent attrition is also referred to as attrition index. Lower the index, better is the attrition index property of catalyst.

Spray drying of gas inlet/outlet temperature of 300 to 350° C./100–200° C. is used in the preparation of FCC catalysts.

Preferred FCC catalyst in the range of 1–10 wt %, preferably 1 to 5 wt %, is mixed with host FCC catalyst and used to crack feedstock such as gas-oil, residual oil and mixtures thereof.

Having described the basic aspect of our invention the following specific examples are given to illustrate specific preferred embodiments.

EXAMPLE 1

Clay Modification 122.3 g of phosphoric acid (85 wt %, LR grade, SD Fine Chem, Mumbai, India) solution was diluted with 821 gm of demineralised water (DM), mixed well and kept under stirring.

To this acid solution 1064 gm of kaolin clay was added under stirring and held for 4 hours. At the end, part of the clay was taken out, washed with required amount of DM water and characterized for surface area and composition.

| Properties | Unmodified clay | Modified clay |
| --- | --- | --- |
| Surface Area, m²/g | 15 | 30 |
| Average Pore Diameter, angstrom | 130 | 90 |

The above example demonstrates that by modification of clay as per the method of the present invention, the surface area is increased from 15 to 30²/g. However, this increase in surface is accompanied with the creation of more micro and meso pores, that has been reflected in the lower average pore diameter.

EXAMPLE 2

Preparation of Semi-basic Alumina 723 gm of sodium aluminate (42% $Al_2O_3$ 35.4% $Na_2O$, 22% $H_2O$) was dissolved in 1990 gm of hot DM water. The undissolved residue was filtered out and the clear solution was heated to 90–95° C. In a 4 liter vessel, 564 gm of aluminum sulfate ($Al_2(SO_4)_3.16H_2O$) was dissolved in 1600 gms, of hot DM water, heated to 80° C. and kept under stirring. To this, hot (90–95° C.) aluminum sulfate solution, previously prepared sodium aluminate solution was added in about 30 minutes till the pH reached between 9.5–9.8. At the end, entire slurry was transferred to a 5 liter capacity plastic container and heated to 95–98° C. for 2 hours. The products were filtered out, washed repeatedly and stored. Part of the sample was dried in air oven and characterized for surface area, crystallinity, particle size and residual soda content. Following are the physical properties of dried product.

| Properties | Semi-basic alumina |
| --- | --- |
| Surface Area, m²/g | 160 |
| Average Particle Size, micron | 1500 nm |
| Residual soda, wt % | 0.15 |

The above example indicates the typical physical properties of semi-basic alumina prepared as per the process of this invention like surface area, average pore diameter and residual sodium oxide.

EXAMPLE 3

Formulation of Catalyst Using Zeolite, Modified Clay and Semi-basic Alumina 2008 gm of modified clay slurry prepared as per example 1, having pH of 1.2 was taken in a 10 liter container and kept under stirring. To this slurry, 625 gm of semi-basic alumina prepared as per example 2, with a solid content of 20 wt % and pH of 8.5, was added under stirring. The mixture was homogenized by vigorous stirring for 10 minutes and pH was recorded as 2.5. 130.21 gm of ZSM-5 zeolite (from M/s Zeolyst, USA) with moisture content of 4 wt %, was ground to a fine paste with equal amount of demineralised water and 0.35 wt % of hexa sodium metaphosphate (based on volatile free zeolite) and added to modified clay-alumina slurry mixture under stirring. Stirring was continued for another 10 minutes, pH was recorded as 2.9. Final slurry with solid concentration of 30-wt %, was spray dried with a feed rate of 80 g/min. Spray dried microspheres were then calcined at 500° C. for 1 hour.

Calcined catalyst microspheres were sieved, and fraction between 100 and 325 mesh was considered. This fraction was selected for further characterization. The catalyst was analyzed for surface area, which was found to be 57 m²/g.

Physical properties of the catalyst prepared as per the present invention are provided below:

| Properties of Catalyst | |
| --- | --- |
| Surface Area, m²/g | 54 |
| Average Bulk Density g/cc | 0.78 |
| Attrition Index wt % | 3 |

The calcined catalyst was steam deactivated at 750° C. for 3 hrs and was evaluated for performance at Simulated MAT conditions with IOC standard feed (Table-1).

The performance data are given in Table-2 and compared with base case wherein the host catalyst does not contain any additive.

It is seen from the Table-2 that compared to base case, the FCC catalyst formulation prepared as per the process of present invention provides enhanced LPG yields. Physical properties of the spray dried product:

Table-1 provides the distillation data of the feedstock that are used for evaluating performance of catalysts prepared. Besides, this table also contains other feed properties like pour point, density, CCR, RCR etc.

TABLE 1

| IOC Standard Feedstock Distillation Data | |
| --- | --- |
| Wt % | ° C. |
| IBP | 315 |
| 5 | 327 |
| 10 | 334 |
| 20 | 346 |
| 30 | 356 |
| 40 | 365 |
| 50 | 375 |
| 60 | 386 |
| 70 | 399 |
| 80 | 415 |
| 90 | 440 |
| 95 | 463 |
| FBP | 528 |
| Pour point,° C. | 36 |
| Density, @ 15° C. (g/cc) | 0.87 |
| CCR (wt %) | 0.008 |
| RCR (wt %) | 0.04 |

TABLE 2

Table-2 provides performance date of catalyst prepared as per the process of the present invention (col 3) and compared with that of a commercial catalyst (col 4). Col 1 shows data for the case when no bifunctional catalyst is used as additive. This table shows that catalyst prepared as per the process of this invention gives more LPG compared to the base case (no additive) and commercial catalyst (col 4). This table also also shows that besides enhancing LPG, catalyst of the present invention also reduces undesirable bottom (370 + wt %) compared to other catalyst and base case.

| Sample No. | Base case No additive | With additive as per Example-3 | With commercial additive |
| --- | --- | --- | --- |
| Conversion, wt % | 58.12 | 63.29 | 60.22 |
| Catalyst to Oil ratio | 0.90 | 0.90 | 0.90 |
| Hydrogen wt % | 0.019 | 0.02 | 0.02 |
| Gas, wt % | 0.95 | 1.00 | 0.98 |
| LPG, wt % | 6.83 | 10.86 | 10.01 |
| Gasoline, wt % | 31.88 | 32.81 | 31.02 |
| HN, wt % | 15.31 | 15.52 | 15.10 |
| LCO, wt % | 27.06 | 25.41 | 24.88 |
| TCO, wt % | 42.37 | 40.93 | 39.98 |
| 370+, wt % | 14.82 | 11.30 | 14.90 |
| Coke, wt % | 3.14 | 3.08 | 3.09 |

EXAMPLE 4

This example refers to a catalyst preparation procedure as per example 3, except employing commercial grade alumina having higher pH and normal unmodified kaolin clay. Spray dried product was characterized and evaluated in a similar way of that done for catalyst under example 3.

TABLE 3

| Properties of Catalyst | |
| --- | --- |
| Surface Area, m²/g | 57 |
| Average Bulk Density g/cc | 0.7 |
| Attrition Index wt % | 14 |

| Sample No. | Base case No additive | With additive as per Example-4 |
| --- | --- | --- |
| Conversion, wt % | 58.12 | 56.29 |
| Catalyst to Oil ratio | 0.90 | 0.9 |
| Hydrogen, wt % | 0.019 | 0.017 |
| Gas, wt % | 0.95 | 0.78 |
| LPG, wt % | 6.83 | 8.05 |
| Gasoline, wt % | 31.88 | 30.26 |
| HN, wt % | 15.31 | 14.86 |
| LCO, wt % | 27.06 | 28.11 |
| TCO, wt % | 42.37 | 42.97 |
| 370+, wt % | 14.82 | 15.60 |
| Coke, wt % | 3.14 | 2.33 |

EXAMPLE 5

Formulation of Catalyst as per Prior art Using Clay and Zeolite 800 gm of kaolin clay was slurried with 560 gm DM water and kept under stirring in a 5 liter plastic container. To this clay slurry 91.24 gm of phosphoric acid (85 wt %) was added under stirring, while pH was measured as 1.2. To the acid clay slurry, a solution prepared by dissolving 55.58 gm of di-ammonium hydrogen phosphate in 150 gms of DM water was added under stirring. There was an increase in the pH of resulting slurry and it was measured as 2.0. To the clay phosphate slurry, a fine paste of alumina prepared by grinding 133.3 gm commercial grade alumina, with 150 gm of DM water was added under stirring. PH of clay-phosphate-alumina was measured as 2.6. Finally, a slurry of zeolite prepared by using 104.2 gm (with 4 wt % moisture) ZSM-5 zeolite having $SiO_2/Al_2O_3$ ratio of 30, and by grinding with 150 gm DM water and 0.35 wt % of sodium hexa metaphosphate (based on volatile free zeolite) was added under stirring to the clay phosphate alumina slurry. Final pH was measured as 2.9.

The above slurry having adjusted solid content of 30-wt %, was spray dried with a condition similar to product prepared under example 3.

Physical properties of the spray dried product:

| Properties of Catalyst | |
|---|---|
| Surface Area, m²/g | 60 |
| Average Bulk Density g/cc | 0.69 |
| Attrition Index wt % | 16 |

The spray-dried product was evaluated with similar procedure employed in earlier examples (3 & 4). The data is given in table 4.

It is seen from the table that compared to base case, the FCC catalyst additive formulation prepared as per prior art process, wherein pH of the slurry was adjusted employing phosphorus containing salts, results in products with low attrition resistance and density.

TABLE 4

| Sample No. | Base case No additive | With additive as per Example-5 |
|---|---|---|
| Conversion, wt % | 58.12 | 55.15 |
| Catalyst to Oil ratio | 0.90 | 0.90 |
| Hydrogen, wt % | 0.019 | 0.015 |
| Gas, wt % | 0.95 | 0.78 |
| LPG, wt % | 6.83 | 8.29 |
| Gasoline, wt % | 31.88 | 28.96 |
| HN, wt % | 15.31 | 14.64 |
| LCO, wt % | 27.06 | 27.87 |
| TCO, wt % | 42.37 | 42.51 |
| 370+, wt % | 14.82 | 16.97 |
| Coke, wt % | 3.14 | 2.44 |

What is claimed is:

1. A process for the preparation of bi-functional catalyst for Fluid Catalytic Cracking (FCC), to obtain enhanced yields of LPG and reduced slurry oil, said process comprising:

(i) preparing a modified kaolin clay slurry by mixing finely milled natural clay powder with phosphoric acid, and aging the clay slurry for 1 to 16 hours at a temperature ranging between 15 and 40° C.;

(ii) preparing a semi-basic alumina by mixing a solution of sodium aluminate and aluminum sulphate at elevated temperatures, mixing under aging conditions for about 30 minutes to 3 hours and removing alumina crystals by filtration and washing the semi-basic alumina cake with water at about 75–85° C.;

(iii) mixing 40–80 wt % of the modified clay slurry (of step i) with 1–20 wt % of the finely dispersed semi-basic alumina (of step ii) and homogenizing the mixture with crystalline molecular sieve zeolite, which is present in the range of 0.5 to 15 wt %;

(iv) spray drying the final slurry; and (v) calcining the spray dried product to obtain said bi-functional catalyst.

2. A process as claimed in claim 1, wherein said crystalline molecular sieve zeolite is selected from the group consisting of mordenite, ZSM-5 and Beta.

3. A process as claimed in claim 1, wherein said modified clay precursor slurry has a pH in the range of 0.1 to 2.

4. A process as claimed in claim 1, wherein the modified clay precursor slurry has a solid concentration in the range of 20–80-wt %.

5. A process as claimed in claim 1, wherein the modified clay when dried at 110° C. for 16 hours and subsequent calcinations at 500° C. for 1 hour shows surface area of about 20 to 40 m²/g.

6. A process as claimed in claim 1, wherein the modified clay when dried at 110° C. for 16 hours and subsequent calcinations at 500 for 1 hour exhibits an average pore diameter of 90–120 angstrom.

7. A process as claimed in claim 1, wherein the presence of modified clay with specifically skewed pore size distribution provides access to bulk sized hydrocarbon molecules that constitute major portion of the bottom of the barrel.

8. A process as claimed in claim 1, wherein said mixing of step (ii) occurs at a temperature of 50–100° C.

9. A process as claimed in claim 1, wherein the semi-basic alumina is prepared by mixing aluminum sulfate with sodium aluminate for duration from 1 to 3 hours.

10. A process as claimed in claim 1, wherein the crystallized semi-basic alumina product has a solid content of 10–20-wt %.

11. A process as claimed in claim 1, wherein the crystallized semi-basic alumina product has a pH in the range of 7.5 to 9.

12. A process as claimed in claim 1, wherein the crystallized semi-basic alumina product has particles with sizes between 4000–5000 nm.

13. A process as claimed in claim 1, wherein the crystalline semi-basic alumina has surface area in the range from 120–180 m²/g.

14. A process as claimed in claim 1, wherein the crystallized semi-basic alumina product has an average pore diameter in the range from 80 to 100 angstrom.

15. A process as claimed in claim 1, wherein the presence of semi-basic alumina creates an environment in the precursor slurry that does not affect adversely the crystallinity of ZSM-5 zeolite.

16. A process as claimed in claim 1, wherein the presence of semi-basic alumina creates a synergy with modified clay resulting in increased LPG yield at the cost of bottom without compromising with gasoline yield or coke make.

17. A process as claimed in claim 1, wherein the crystallized semi-basic alumina product has crystallinity between 65 to 90%.

18. A process as claimed in claim 1, wherein said fluid catalytic cracking process is conducted at a reaction temperature of about 400 to 700° C. and regeneration temperature 500 to 850° C.

19. A process as claimed in claim 1, wherein said fluid catalytic cracking catalyst reacts with a hydrocarbon selected from the group consisting of gas-oil, residual oil, and mixtures thereof.

20. A process as claimed in claim 1, wherein the said catalyst is taken in the range of 1–5wt % and mixed with FCC catalyst for catalytic cracking of high boiling feedstock.

21. A process as claimed in claim 1, wherein said catalyst is resistant to attrition and has an attrition index in the range of 3–15%.

* * * * *